US012779908B2

(12) United States Patent
Barbarin et al.

(10) Patent No.: US 12,779,908 B2
(45) Date of Patent: Nov. 3, 2026

(54) CARCASS REINFORCEMENT FOR A TIRE OF A HEAVY DUTY CIVIL ENGINEERING VEHICLE

(71) Applicant: COMPAGNIE GENERALE DES ETABLISSEMENTS MICHELIN, Clermont-Ferrand (FR)

(72) Inventors: François Barbarin, Clermont-Ferrand Cedex (FR); Olivier Reix, Clermont-Ferrand Cedex (FR); Gaël Pataut, Clermont-Ferrand Cedex (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 811 days.

(21) Appl. No.: 17/414,535

(22) PCT Filed: Dec. 12, 2019

(86) PCT No.: PCT/FR2019/053035

§ 371 (c)(1),
(2) Date: Jun. 16, 2021

(87) PCT Pub. No.: WO2020/128243

PCT Pub. Date: Jun. 25, 2020

(65) Prior Publication Data

US 2022/0048326 A1 Feb. 17, 2022

(30) Foreign Application Priority Data

Dec. 17, 2018 (FR) ...................................... 1873044
Jan. 29, 2019 (FR) ...................................... 1900773

(51) Int. Cl.
*B60C 9/06* (2006.01)
*B60C 9/00* (2006.01)
(Continued)

(52) U.S. Cl.
CPC .............. *B60C 9/06* (2013.01); *B60C 9/0007* (2013.01); *B60C 9/02* (2013.01); *B60C 9/04* (2013.01);
(Continued)

(58) Field of Classification Search
None
See application file for complete search history.

(56) References Cited

U.S. PATENT DOCUMENTS 2,188,174 A * 1/1940 Castricum ................ 152/557 X
2,317,912 A * 4/1943 Howe ....................... B60C 9/06
152/556 X
(Continued)

FOREIGN PATENT DOCUMENTS

GB 935755 9/1963
GB 1 487 426 A * 9/1977
(Continued)

*Primary Examiner* — Adrienne C. Johnstone
(74) *Attorney, Agent, or Firm* — COZEN O'CONNOR

(57) ABSTRACT

A tire design for a heavy-duty vehicle of construction plant type has a crown reinforcement (40) radially on the inside of a tread (10) and radially on the outside of a carcass reinforcement (70). The carcass reinforcement (70) has at least two carcass layers (50, 60) having metal reinforcers coated in an elastomer compound. The carcass layers (50, 60) have respective stiffnesses per unit width R1, R2. Metal reinforcers of a first carcass layer (50) form, with the circumferential direction (XX'), an angle A1, and those of the second carcass layer form an angle A2, such that the angles A1 and A2, and the stiffnesses R1 and R2, simultaneously satisfy the following three relationships: $R1*\sin^2(2*A1)+R2*\sin^2(2*A2) \geq (R1+R2)*)\sin^2(30°)$, and $||A1|-|A2||<10°$, and $0.7 \leq R1/R2<1.3$. The metal reinforcers have a critical compression buckling deformation DF at least equal to 2.5% and a compression elastic modulus MC at least equal to 10 GPa.

10 Claims, 3 Drawing Sheets

(51) Int. Cl.

| | |
|---|---|
| ***B60C 9/02*** | (2006.01) |
| ***B60C 9/04*** | (2006.01) |
| ***B60C 9/22*** | (2006.01) |
| ***B60C 15/00*** | (2006.01) |
| *D07B 1/06* | (2006.01) |

(52) U.S. Cl.
CPC ............ *B60C 9/22* (2013.01); *B60C 15/0009* (2013.01); *B60C 15/0018* (2013.01); *B60C 15/0072* (2013.01); *B60C 2009/0246* (2013.01); *B60C 2009/0253* (2013.01); *B60C 2009/0416* (2013.01); *B60C 2009/0425* (2013.01); *B60C 2009/0433* (2013.01); *B60C 2009/0466* (2013.01); *B60C 2009/0475* (2013.01); *B60C 2009/2214* (2013.01); *B60C 2200/065* (2013.01); *D07B 1/06* (2013.01)

(56) References Cited

U.S. PATENT DOCUMENTS

| | | | | | |
|---|---|---|---|---|---|
| 3,231,000 | A * | 1/1966 | Massoubre | ............... | 152/534 X |
| 3,542,111 | A | 11/1970 | Kovac et al. | | |
| 3,627,012 | A * | 12/1971 | Fletcher | ................ | B60C 9/0007 152/556 X |
| 4,096,899 | A * | 6/1978 | Kitazawa | ............ | B60C 15/0018 152/543 X |
| 5,843,583 | A | 12/1998 | D'Haene et al. | | |
| 8,857,146 | B2 * | 10/2014 | Gauthier | .............. | D07B 1/0613 |
| 9,267,233 | B2 * | 2/2016 | Barguet | ............... | D07B 1/0613 |

FOREIGN PATENT DOCUMENTS

| | | |
|---|---|---|
| WO | WO 2005/014925 | 2/2005 |
| WO | WO 2007/090603 | 8/2007 |

* cited by examiner

CARCASS REINFORCEMENT FOR A TIRE OF A HEAVY DUTY CIVIL ENGINEERING VEHICLE

RELATED APPLICATIONS

This is a U.S. National Phase Application under 35 USC 371 of International Application PCT/FR2019/053035 filed on Dec. 12, 2019.

This application claims the priority of French application nos. FR 18/73044 filed Dec. 17, 2018 and FR 1900773 filed Jan. 29, 2019.

FIELD OF THE INVENTION

The subject matter of the present invention is a radial tire, intended to be fitted to a heavy-duty vehicle of construction plant type, and more specifically the present invention relates to the carcass reinforcement of such a tire.

BACKGROUND OF THE INVENTION

Typically, a radial tire for a heavy-duty vehicle of construction plant type, within the meaning of the European Tire and Rim Technical Organization or ETRTO standard, is intended to be mounted on a rim with a diameter at least equal to 25 inches. Although not limited to this type of application, the invention is described for a radial tire of large size, which is intended to be mounted on a dumper, a vehicle for transporting materials extracted from quarries or surface mines, by way of a rim with a diameter at least equal to 35 inches, possibly as much as 57 inches, or even 63 inches.

Since a tire has a geometry exhibiting symmetry of revolution about an axis of rotation, the geometry of the tire is generally described in a meridian plane containing the axis of rotation of the tire. For a given meridian plane, the radial, axial and circumferential directions denote the directions perpendicular to the axis of rotation of the tire, parallel to the axis of rotation of the tire and perpendicular to the meridian plane, respectively. The circumferential direction is tangential to the circumference of the tire.

In the following text, the expressions “radially inner/radially on the inside” and “radially outer/radially on the outside” mean “closer to” and “further away from the axis of rotation of the tire”, respectively. “Axially inner/axially on the inside” and “axially outer/axially on the outside” mean “closer to” and “further away from the equatorial plane of the tire”, respectively, with the equatorial plane of the tire being the plane that passes through the middle of the tread surface and is perpendicular to the axis of rotation.

Generally, a tire comprises a tread intended to come into contact with the ground via a tread surface, the two axial ends of which are connected via two sidewalls to two beads that provide the mechanical connection between the tire and the rim on which it is intended to be mounted.

A radial tire further comprises a reinforcement made up of a crown reinforcement radially on the inside of the tread and of a carcass reinforcement radially on the inside of the crown reinforcement. Each reinforcement is made up of composite layers comprising parallel reinforcers coated in an elastic compound.

As regards the metal reinforcers, a metal reinforcer is mechanically characterized by a curve representing the tensile force (in N) applied to the metal reinforcer as a function of the relative elongation (in %) thereof, known as the force-elongation curve. Mechanical tensile characteristics of the metal reinforcer, such as the structural elongation As (in %), the total elongation at break At (in %), the force at break Fm (maximum load in N) and the breaking strength Rm (in MPa) are derived from this force-elongation curve, these characteristics being measured in accordance with the standard ISO 6892 of 1984.

The total elongation at break At of the metal reinforcer is, by definition, the sum of the structural, elastic and plastic elongations thereof (At=As+Ae+Ap). The structural elongation As results from the relative positioning of the metal threads making up the metal reinforcer under a low tensile force. The elastic elongation Ae results from the actual elasticity of the metal of the metal threads making up the metal reinforcer, taken individually, with the behaviour of the metal following Hooke’s law. The plastic elongation Ap results from the plasticity, i.e. the irreversible deformation beyond the yield point, of the metal of these metal threads taken individually. These various elongations and the respective meanings thereof, which are well known to a person skilled in the art, are described, for example, in the documents U.S. Pat. No. 5,843,583, WO2005/014925 and WO2007/090603.

Also defined, at any point on the stress-elongation curve for a metal reinforcer, is a tensile modulus, expressed in GPa, which represents the gradient of the straight line tangential to the stress-elongation curve at this point. In particular, the tensile modulus of the elastic linear part of the stress-elongation curve is referred to as the tensile elastic modulus or Young’s modulus.

In the linear part of the force-elongation curve for the reinforcer, the stiffness of the metal reinforcer is defined as being the gradient of the force-elongation curve, and the stiffness of the composite layer is defined as being the ratio of the stiffness of the metal reinforcer to the pitch spacing of the layer, namely the distance between the centres of two consecutive reinforcers.

Among the metal reinforcers, a distinction is usually made between the elastic metal reinforcers, such as those used in the protective or hooping layers, and the inextensible or non-extensible metal reinforcers, such as those used in the working layers.

An elastic metal reinforcer is characterized by a structural elongation As at least equal to 1% and a total elongation at break At at least equal to 4%. Moreover, an elastic metal reinforcer has a tensile elastic modulus at most equal to 150 GPa, and usually between 40 GPa and 150 GPa.

An inextensible metal reinforcer is characterized by a total elongation At, under a tensile force equal to 10% of the force at break Fm, at most equal to 0.2%. Moreover, an inextensible metal reinforcer has a tensile elastic modulus usually between 150 GPa and 200 GPa.

A tire of a heavy-duty industrial vehicle, notably of construction plant type, is subjected to numerous attacks. Specifically, this type of tire usually runs on a road surface littered with obstacles, sometimes resulting in perforations of the tread and of the crown. These perforations allow the entry of corrosive agents, for example air and water, which oxidize the metal reinforcing elements of the crown reinforcement, in particular of the crown layers, and considerably reduce the life of the tire.

The indentation stiffness is a physical quantity indicative of the resistance of the crown to perforation when running over an indenting feature such as a rock, for example, having a size of several tens of centimetres. The lower the indentation stiffness, the better the crown performs in terms of absorbing obstacles.

In order to measure the indentation stiffness of a tire, a test involving running over standardized obstacles is performed. These obstacles are hemispherical-head polars of varying height and diameters. Typically, the diameter of a polar varies between 0.5 inches and 3 inches, for a height of between 25 mm and 400 mm. The tire is mounted on the rim of a vehicle of the dumper type and inflated. A number of successive passes over the polar are performed, with the height of the polar being progressively increased. The test is ended when, on running over a sufficiently tall polar, the crown of the tire being tested is finally perforated. During the test, a device makes it possible to measure the maximum loads generated at the centre of the wheel. At the end of the test, the loads at the centre of the wheel are represented as a function of the height of the polars. The indentation hardness corresponds to the variation in vertical load at the centre of the wheel with respect to the variation in height of the polars.

Construction plant tires are also characterized by their radial stiffness which corresponds to the ratio between the variation in the vertical-loading load and the height of the compression deformation achieved on flat ground.

The requirements to increase the productivity of the mining operations in which such tires are used has led to a need to increase the load carried. Typically, on a size such as 24.00R35, the nominal load standardized for example in the ETRTO standard is of the order of 20 tonnes, but certain uses may require this load to be increased by more than 15%.

One conventional solution to such a requirement is to increase the tire inflation pressure for the same amount of compression deformation. This increase in the pressure thus leads to an increase in the radial stiffness of the tire, allowing it to carry the increased nominal load, but at the same time leads to an increase in the indentation stiffness, thereby further weakening the tire when it runs over obstacles.

SUMMARY OF THE INVENTION

The inventors have set themselves an objective of proposing a tire design that allows said tire to carry an overload of at least 15% with respect to its nominal load, while at the same time maintaining sufficient resistance with respect to the attacks brought about by running over obstacles.

This objective has been achieved, according to the invention, by a tire for a heavy-duty vehicle of construction plant type, comprising:

- radially from the outside to the inside, a tread, a crown reinforcement and a carcass reinforcement,
- said crown reinforcement comprising at least one crown layer formed of elastic metal reinforcers coated in an elastomer compound making, with a circumferential direction (XX'), an angle A;
- said carcass reinforcement being made up of at least two carcass layers comprising metal reinforcers coated in an elastomer compound, said carcass layers having stiffnesses per unit width R1, R2, for the first and second layers, respectively, measured in the equatorial plane (XY);
- the metal reinforcers of a first carcass layer form, with the circumferential direction (XX'), an angle A1, and the metal reinforcers of a second carcass layer form, with the circumferential direction (XX'), an angle A2, such that the angles A1 and A2, and the stiffnesses R1 and R2, measured in the equatorial plane (XZ), simultaneously satisfy the following three relationships:

$$R1 * \sin^2(2 * A1) + R2 * \sin^2(2 * A2) \geq (R1 + R2) * \sin^2(30°) \quad \text{a}$$

$$||A1| - |A2|| < 10°, \quad \text{b}$$

$$0.7 \leq R1/R2 \leq 1.3; \quad \text{c}$$

- the metal reinforcers of each carcass layer have a critical compression buckling deformation DF at least equal to 2.5% and a compression elastic modulus MC at least equal to 10 GPa.

A main idea behind the invention is to arrive at a compromise between the radial stiffness, useful for load-bearing, and the indentation stiffness, which needs to be low enough to allow the tire to absorb the obstacles without the crown becoming perforated.

The main idea behind the invention is to arrive at a compromise between the radial stiffness, useful for load-bearing, and the indentation stiffness, which needs to be low enough to allow the tire to absorb the obstacles without the crown becoming perforated.

The solution of the invention proposes a carcass reinforcement of at least two composite layers provided with reinforcers that are elastic enough to avoid them buckling when loaded in compression.

As it runs, a construction plant tire generates buckling stresses in the cords of its carcass reinforcement, which are made to bend to a significant degree, such that they have a tendency to buckle, leading to an increase in the curvature of the individual threads, causing thread breakages. These cords may then break prematurely, thus determining the running endurance limit of the tire.

In general, the reinforcing elements that are used in the composite layers of the carcass reinforcements of construction plant tires are made of metal cords comprising, for example, several layers of threads or several strands which are wound together in a helix with variable pitches. The threads usually have a diameter of between 0.15 mm and 0.5 mm and are made for example of steel having a carbon content of between 0.15% and 1.2%. These threads are obtained by cold working, having been coated beforehand with a thin coat of a metal (such as brass, zinc or bronze) to encourage said cold working and/or to encourage adhesion to the rubber composition used in said composite layer.

In order to delay the onset of buckling in the cords of the carcass reinforcement, the solutions known from the prior art consist in adding to each cord a wrapping wire of small diameter (usually comprised between 0.10 mm and 0.25 mm) wound in a helix on the external surface of the cord. In general, this wrapping wire is wound with a very short pitch (for example ranging from 3 mm to 5.5 mm) and in the opposite direction from, or in the same direction as, the direction of winding of the threads of said external layer. However, these solutions have the disadvantage of resulting in cords with a critical compression buckling deformation that is low. The inventors have therefore focused on the possibility of pushing back this critical compression buckling deformation through the use of more suitable cords.

The inventors have alleviated these difficulties by proposing carcass layers which have reinforcers in the form of multistrand elastic metal rope cords made up of an internal layer of strands wound in a helix, and of an external layer wound in a helix around the internal layer.

The structural elongation of multistrand elastic rope cords is well known to those skilled in the art. This property gives the elastic cord the possibility to deform extensively under light load. It is from the curvature of the threads or of the strands of these cords and from the radial clearance allowed to the threads and/or to the strands that this structural elongation originates. The structural elongation thus allows these cords to deform more than compact cords when stressed by light loads, and to do so elastically. This lower stiffness of the cord is useful in compressive axial loading because it will also allow the cord to deform more extensively than a compact cord, without buckling.

An embodiment of the invention also proposes a design that is simplified through the omission of the working crown layers, counter to the routine practice of the prior art, the function of these being taken over by the two carcass layers made up of elastic reinforcers crossing at the crown. This simplified design makes it possible to reduce the indentation stiffness.

The tire design proposed by the invention is distinguished by the combined functions of the carcass reinforcement in contributing to the radial stiffness for load-bearing while at the same time contributing to the tire guidance function for cornering performance.

Radially on the outside of the carcass reinforcement, the crown reinforcement of a tire according to the invention comprises a crown layer which can sometimes meet the need to protect the carcass reinforcement or sometimes meet the need for hooping. Other variants of the invention may include both a hoop reinforcement and the protective reinforcement.

When the crown reinforcement is meeting a need for hooping, the reinforcers of the layer are coated in an elastomer compound and make, with a circumferential direction (XX') tangential to the circumference of the tire, an angle of between −2.5° and 2.5°. Hooping adds circumferential stiffness which plays a part particularly in the flattening of the inflated tire, mounted on its rim, and compressed by the load being carried.

According to an embodiment of the invention, the metal reinforcers of a first carcass layer form, with the circumferential direction (XX'), an angle A1, and the metal reinforcers of a second carcass layer form, with the circumferential direction (XX'), an angle A2, such that the angles A1 and A2, and the stiffnesses R1 and R2, measured in the equatorial plane (XZ), simultaneously satisfy the following three relationships:

$$R1 * \sin^2(2 * A1) + R2 * \sin^2(2 * A2) \geq (R1 + R2) * \sin^2(30°), \quad \text{a}$$

$$||A1| - |A2|| < 10°, \quad \text{b}$$

$$0.7 \leq R1/R2 \leq 1.3. \quad \text{c}$$

The first relationship, R1*sin2 (2*A1)+R2*sin2(2*A2)≥(R1+R2)*sin2(30°), is the result of expressing the shear stiffnesses in the plane (XY), as a function of the angles A1 and A2 of the reinforcers. The second relationship, in terms of absolute values, ||A1|−|A2||<10°, allows the angle A2 to be deduced, when the angle A1 is known. The third relationship, 0.7≤R1/R2≤1.3, is representative of the fact that the difference in stiffness per unit width of the carcass layers, measured in the equatorial plane (XY), are low, namely comprised within an interval representing 30%. This difference in stiffness per unit width of the carcass layers allows the tensions absorbed to be distributed more uniformly and also makes it possible to limit the maximum levels of compression in the two layers.

The difference in stiffness between the two carcass layers is due either to the use of different reinforcers or to the use of the same reinforcers but at different pitch spacings.

In addition to the orientation of the reinforcers with respect to the circumferential direction, the mechanical properties of the reinforcers, particularly under compressive loading, also govern the proper working of the invention.

Still according to an embodiment of the invention, the metal reinforcers of each carcass layer have a critical compression buckling deformation DF at least equal to 2.5% and a compression elastic modulus MC at least equal to 10 GPa.

During the manufacture of the tire, the two carcass layers, together with the other compounds that make up the tire carcass, are placed flat on a drum. At the end of the building of the carcass reinforcement, the tire is shaped by inflating the tire-building drum to arrive at the well-known toric shape of tires. It is known that the angles of the two carcass layers vary, decreasing from the position near the bead wire as far as the crown. The two different angles of the carcass layers form triangulation beneath the crown, imparting stiffness to the tire.

When the tire is being driven on, on entering and leaving the contact patch, the cords in the carcass layers are loaded in compression.

The solution works if the carcass layers are able to withstand the compression loadings without buckling. In order to achieve that, the inventors have noticed that the use of reinforcers in the form of elastic cords with high structural elongation improves the compression behaviour by pushing back the critical buckling deformation to 2.5%. For conventional reinforcers based on compact cords, the critical buckling deformation is somewhat less than 1%, which is insufficient. The compression elastic modulus values for these cords need to be greater than 10 GPa.

In a preferred embodiment of the invention, the angles A1 and A2 have opposite orientations with respect to the circumferential direction (XX').

In a simplified embodiment of the invention, the two layers of the carcass reinforcement are crossed with reinforcers that make, with the circumferential direction (XX'), angles A1 and A2 which are equal in terms of absolute value and opposite in terms of orientation.

The use of opposite angles in the two carcass layers leads to triangulation beneath the crown in a geometric shape similar to lozenge shapes as a result of the crossing of the reinforcers with opposite orientations. This triangulation in the approximate shape of lozenges confers a maximum level of stiffness on the carcass reinforcement.

Advantageously, the angles A1 and A2 have absolute values comprised in the interval [15°; 75°].

According to the inventors, the shear stiffnesses in the plane (XY) which give the tire its ability to guide the vehicle under cornering reach a sufficiently high value when the angles A1 and A2 are both, in terms of absolute value, comprised in the interval [15°; 75°].

Still according to the invention, the stiffnesses per unit width of carcass layer R1, R2 for the first and second carcass layer, respectively, are identical.

In this embodiment, the two carcass layers are made up of the same reinforcers with the same pitch spacings, with the objective of achieving standardization in the manufacture of the tire.

In a preferred embodiment of the invention, the metal reinforcers of each carcass layer are multistrand rope cords of structure 1×N comprising a single layer of N strands wound in a helix, each strand comprising an internal layer of M internal threads wound in a helix and an external layer of P external threads wound in a helix around the internal layer.

It is advantageous to have cords for which N=3 or 4 strands.

It is also advantageous to have a number of internal threads for each strand M=1, 3, or 4, and P=5, 6, 8 or 9.

Stranded elastic cords are known to those skilled in the art and are characterized by the strands being combined in a twist. Each strand is a combination of metal threads made of steel twisted together. The strands may also be compact cords. The strands may not have a saturated layer of threads. This allows the cord to have more structural clearance or ventilation. However, it also gives it a greater ability to be penetrated by the rubber. These elastic cords, thanks to the curvature of their threads or strands, have an axial compressibility that is far superior to that of compact cords of equivalent compression stiffness.

Mention may be made, by way of example, of a 4×(1+5)×0.026 cord. In other words, this cord is made up of 4 strands each of two layers. The internal layer comprises a single thread and the external layer 5 threads. Each thread has a diameter of 26 hundredths of a millimetre. Thus, using the notation mentioned above: N=4, M=1 and P=5.

In addition to the mechanical properties of the cords, the relative positions of the two carcass layers also have an impact on the endurance performance of the tire. The inventors have established that, depending on the size under consideration, and the conditions of use in terms of load and pressure, there are various possible configurations for the layers of the carcass reinforcement, depending on the desired mechanical effect to be achieved.

According to another preferred embodiment of the invention, an interior first carcass layer comprises a main part wrapped, within each bead, from the inside towards the outside of the tire, around a bead wire nucleus to form a turn-up, and an exterior second carcass layer comprises a main part wrapped, at least partially within each bead, from the outside towards the inside of the tire, around a bead wire nucleus.

An interior carcass layer is said to have a “turn-up” when it comprises a main part that connects the two beads together and is wrapped, in each bead, from the inside of the tire to the outside around the bead wire nucleus so as to form a turn-up having a free end. Thus, the first carcass layer has a turn-up and the second layer does not have a turn-up.

In the case of a carcass layer without a turn-up, each of the two end portions of said carcass layer without a turn-up may be coupled either with the turn-up, or with the main part of a carcass layer that does have a turn-up. Coupling is understood to mean a region of overlap between the carcass layer without a turn-up and a turned-up carcass layer, allowing the tensile loadings to be reacted by shear.

In this embodiment, the carcass reinforcement comprises three portions: an axially outermost first portion, with a superposition of three layers, namely the main part of the axially innermost carcass layer, its turn-up around the bead wire, and the second carcass layer that does not have a turn-up. A second portion which connects the two ends of the turn-ups of the axially innermost carcass layer and which comprises the two carcass layers. Finally, the carcass reinforcement comprises a third zone symmetrical with the first with respect to the radial axis in the meridian plane.

The reinforcing elements of the main part of a carcass layer with or without a turn-up are substantially parallel. The reinforcing elements of a turn-up of a carcass layer are also substantially parallel and form, with respect to the circumferential direction, an angle that is the opposite of that of the main part. This orientation of the reinforcers for the main part and the turn-up have the effect of limiting shear between carcass layers.

In another embodiment of the invention, each carcass layer comprises a main part wrapped, within each bead, from the inside towards the outside of the tire, around a bead wire nucleus to form a turn-up.

In this embodiment, both carcass layers have a turn-up. The free ends of the turn-ups of the two carcass layers need to be sufficiently spaced apart from one another to prevent them from coinciding. A minimum distance of 15 mm to 20 mm is recommended for this purpose.

It is advantageous for the crown reinforcement to be made up of at least one layer comprising metal reinforcers coated in an elastomer compound and forming, with the circumferential direction (XX'), an angle A at most equal to 2.5° in terms of absolute value.

In such a configuration, the crown reinforcement meets the need for hooping, which adds circumferential stiffness which plays a part particularly in the flattening of the inflated tire, mounted on its rim, and compressed by the load being carried.

The tire of the invention comprises a crown reinforcement of at least one layer radially on the outside of a carcass reinforcement. In the simplest configuration of the invention, the tire comprises the carcass reinforcement and a crown restricted to a single layer.

BRIEF DESCRIPTION OF THE DRAWINGS

The features of the invention will be better understood with the aid of the description of the attached FIGS. 1, 2, 3 and 4.

FIG. 1 depicts an exploded view in section on a meridian plane of a tire for a heavy-duty vehicle of construction plant type according to the invention, with one single carcass layer turned up around the bead wire. The second carcass layer has no turn-up;

FIG. 2 depicts an exploded view in section on a meridian plane of a tire for a heavy-duty vehicle of construction plant type according to the invention, with both carcass layers turned up around the bead wire;

FIG. 3 depicts a perspective view of the cutaway of FIG. 2 of a tire for a heavy-duty vehicle of construction plant type, according to the invention;

DETAILED DESCRIPTION OF THE DRAWINGS

Figure 1:
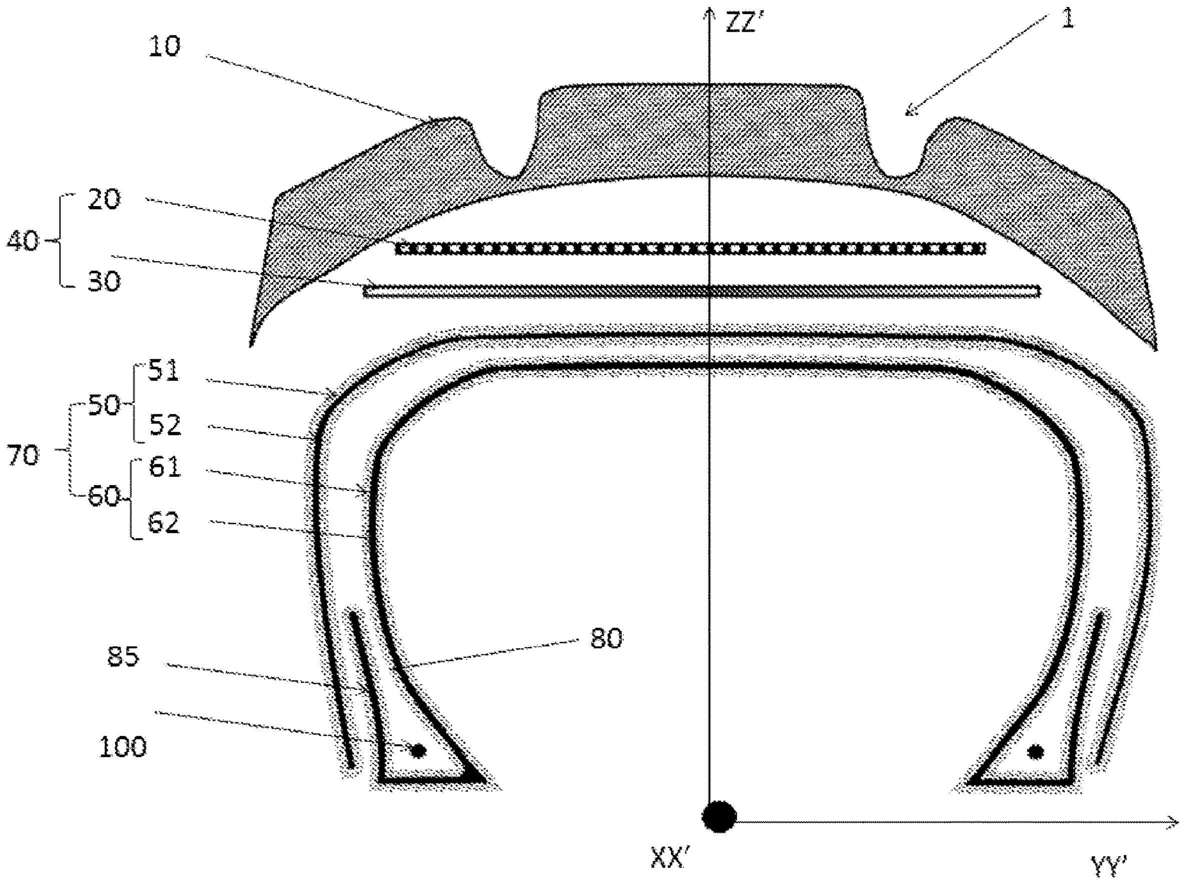
FIGS. 1, 2 and 3 are described in relation to a crown reinforcement comprising at least two crown layers.

FIG. 1 shows, in a meridian plane of a tire 1 of the invention:

- a tread 10 intended to be in contact with the ground, radially on the outside of a crown reinforcement 40 formed of two composite layers 20 and 30 comprising metal reinforcers coated in an elastomer compound. The crown reinforcement is itself radially on the outside of a carcass reinforcement 70.
- the carcass reinforcement 70 comprises a first carcass layer 60, radially innermost beneath the tread, having a main part 80 wrapped, within each bead, from the inside towards the outside of the tire, around a bead wire nucleus 100 to form a turn-up 85. The carcass reinforcement is supplemented by a second carcass layer 50, radially on the outside of the first carcass layer 60 and in contact therewith. It comprises a main part wrapped, at least in part within each bead, from the outside towards the inside of the tire, around the bead wire nucleus 100. The two carcass layers (50, 60) are made up of reinforcers (52, 62) coated in an elastomer compound (51, 61). The first carcass layer 60 is said to be turned up around the bead wire 100.

Figure 2:
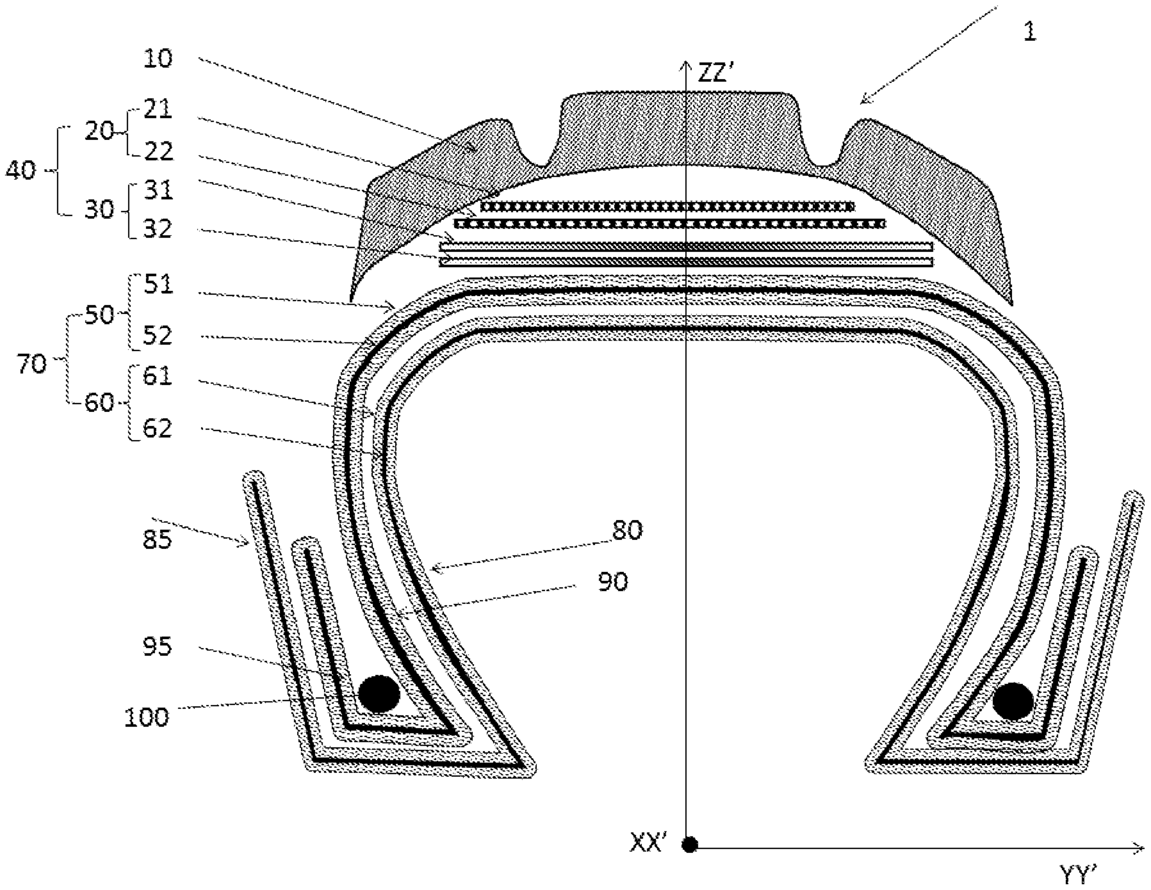

FIG. 2 shows another tire 1 according to the invention:

a tread 10 intended to be in contact with the ground, radially on the outside of a crown reinforcement 40 formed of four crown layers comprising metal reinforcers coated in an elastomer compound. These crown layers are grouped into a hoop reinforcement 30 with the hooping layers (31, 32), and into a protective reinforcement 20 with the protective layers (21, 22). The crown reinforcement is itself radially on the outside of a carcass reinforcement 70;

The carcass reinforcement 70 comprises two carcass layers 50 and 60, the carcass layer 60 being the radially innermost one, each carcass layer (50, 60) respectively having a main part (90, 80) wrapped within each bead, from the inside to the outside of the tire, around a bead wire nucleus 100, to form a turn-up (95, 85). The two carcass layers (50, 60) comprise metal reinforcers (52, 62) coated in an elastomer compound (51, 61).

Figure 3:
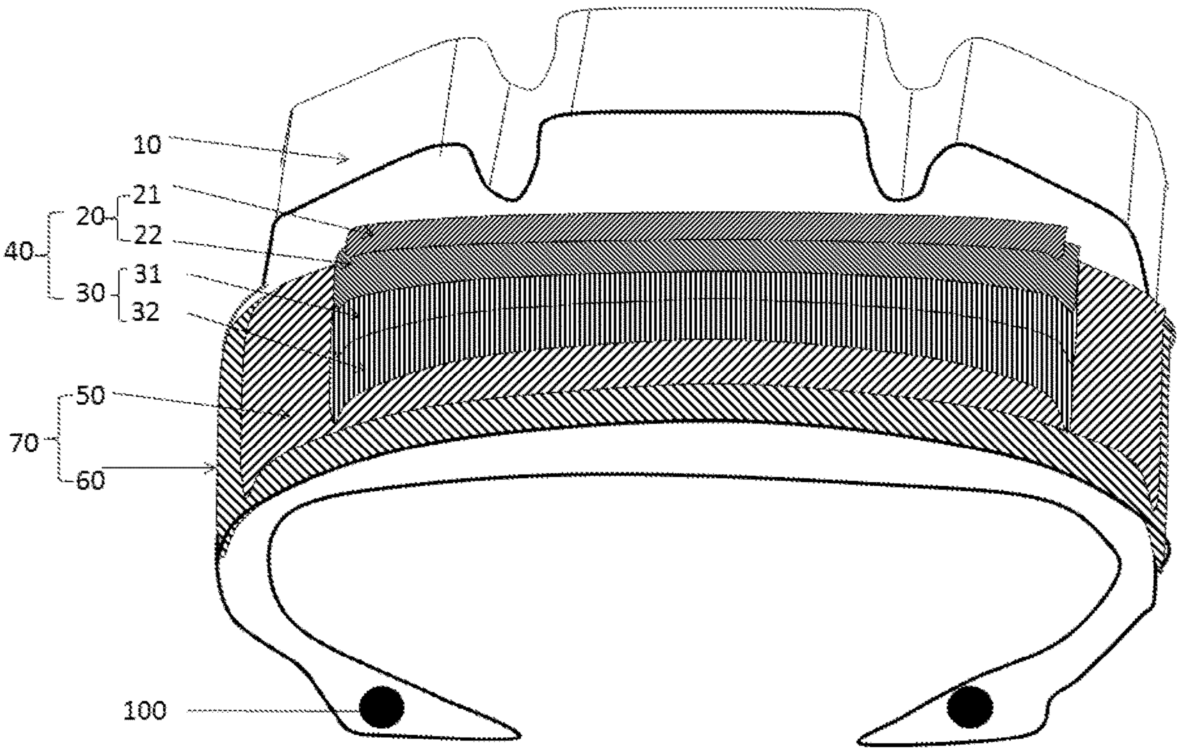

FIG. 3 depicts a perspective view of the tire of FIG. 2 of the invention, showing the stack of layers of the carcass 70, hoop 30 and protective 20 reinforcements capped by the tread 10.

Figure 4:
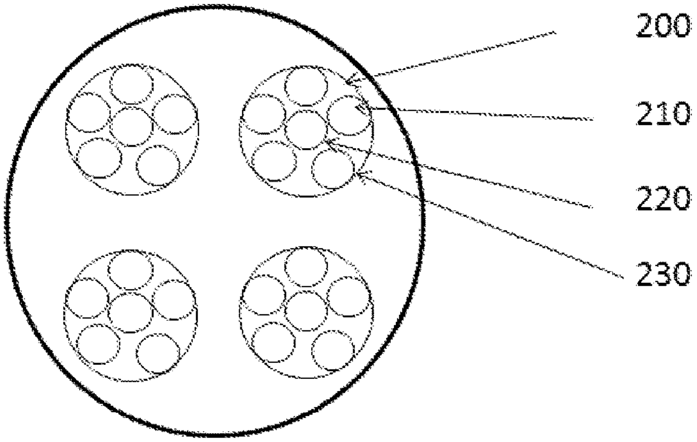
FIG. 4 depicts a reinforcer of the carcass layers in the form of the cord comprising four strands.

FIG. 4 depicts an example of cords formed of four strands 200. Each strand 200 comprises an internal layer 220 of M threads, and an external layer 230 of P threads. Thus, in FIG. 4, the number N of strands is equal to 4, the number M of threads in the internal layer is equal to 1, and finally the number of threads in the external layer is equal to 5. This cord is designated: 4×(1+5)×0.26, where 0.26 represents the diameter of each thread in millimetres.

The 24.00R35 size of tire was designed according to the invention, as depicted in FIG. 1. These results were compared against those of a reference tire as defined hereinbelow.

The reference tire comprises, radially from the inside towards the outside:

a carcass reinforcement having a single carcass layer formed of 49 threads each measuring 23 hundredths of a millimetre in diameter. The angle made by the reinforcers with the circumferential direction is 90°. This is a radial carcass reinforcement turned up around the bead wire;

a hoop reinforcement with two superposed hooping layers each comprising reinforcers made up of a collection of 26 threads each measuring 30 hundredths of a millimetre in diameter. The hooping layers are crossed with angles of ±8°;

a working reinforcement with two crossed layers making angles of 19°/−33°, formed of reinforcers made up of a collection of 26 threads each measuring 30 hundredths of a millimetre in diameter;

a protective reinforcement with two crossed layers making angles of ±24°, formed of reinforcers made up of a collection of 24 threads each measuring 26 hundredths of a millimetre in diameter.

By way of example, two crossed layers at 19°/−33° means that with respect to the radial direction from the outside towards the inside of the tire, the reinforcers of the first layer encountered make angles of 19° with the circumferential direction XX', and the reinforcers of the second layer make angles of −33°.

The carcass reinforcement of the reference tire is made up of a single carcass layer comprising reinforcers in the form of compact wrapped cable cords within the meaning of the definition given in standard ISO 17893:2004. The stack of layers of the reference tire comprises, in addition to the carcass reinforcement, the working layers, the hooping layers and the protective layers, the characteristics of which are defined in the table which follows. The angles and the pitch spacings were measured at the crown of the tire:

TABLE 1

| Tire design | Assembly of reinforcers | Angle of reinforcers wrt XX' at centre of crown | Breaking strength of reinforcers (N) | Pitch spacing of reinforcers within the layer (mm) |
|---|---|---|---|---|
| 2. Protective layers | 4 × (1 + 5) × 0.26 | 24°/−24° | 2650 | 2.5 |
| 2 Working layers | 3 + (9 + 14 × 0.30)FR | 19°/−33° | 6000 | 3.4 |
| 2 Hooping layers | 3 + (9 + 14 × 0.30)FR | 8°/−8° | 6000 | 3.5 |
| Carcass layer | (1 + 6) × (1 + 6) × 0.23FR | 90° | 5400 | 6.2 |

For the control tire, the reinforcers of the carcass layer have a compression modulus of 75 GPa and a critical buckling deformation of 0.4%

The inflation pressure is 725 kPa for a load of 20 000 kg to be carried.

The tire of the invention is the same size as the reference tire, 24.00R35, and comprises, radially from the inside to the outside:

a carcass reinforcement with two carcass layers each comprising reinforcers of 24 threads each measuring 26 hundredths of a millimetre in diameter. This is a multistrand rope cord, with 4 strands assembled in two layers: an internal layer of one thread and an external layer of 5 threads. The two carcass layers are not radial, and so this is a bias-belted carcass reinforcement;

two layers with reinforcers making angles smaller than 2.5° in terms of absolute value, in order to perform both the protective and hooping functions.

The table which follows summarizes the design choices for the tire according to the invention and depicted in FIG. 1:

TABLE 2

| Tire design | Assembly of reinforcers | Angle of reinforcers at centre of crown (°) | Breaking strength of reinforcers (N) | Pitch spacing of reinforcers within the layer (mm) |
|---|---|---|---|---|
| 2 Protective/hooping layers | 4 × (4 + 9) × 0.26 | 0° | 6000 | 3.7 |

TABLE 2-continued

| Tire design | Assembly of reinforcers | Angle of reinforcers at centre of crown (°) | Breaking strength of reinforcers (N) | Pitch spacing of reinforcers within the layer (mm) |
|---|---|---|---|---|
| 2 Carcass layers | 4 × (1 + 5) × 0.26 | 65°/−65° | 2650 | 5.5 |

For the tire of the invention, the reinforcers of the carcass layer have a compression modulus of 45 GPa and a critical buckling deformation of 4%.

The design of the tire of the invention is simplified by comparison with the reference in so far as the working layers have been omitted and the carcass layers combine both the functions of load-bearing and of guiding the vehicle under cornering.

In this example, the protective reinforcement comprises a single layer, and likewise the hoop reinforcement comprises just a single hooping layer. The protective and hooping layers have the same coating compound, and the angles that the reinforcers make with the circumferential direction XX' are equal to 0° for both layers.

The carcass reinforcement comprises two layers, of which the radially innermost is turned up around the bead wire. The reinforcers of each carcass layer make, with the circumferential direction (XX') an angle, in terms of absolute value, of 65° measured at the crown of the tire.

Finite-element calculation simulations were carried out on the reference tire and the tire of the invention, respectively. The values observed were:

the radial stiffness of the tire of the invention capable of carrying 15% more load than the reference tire;

the indentation stiffnesses;

the cornering stiffnesses associated with the guiding of the vehicle.

These results are collated in the following table:

TABLE 3

| | Radial stiffnesses (N/m) | Indentation stiffness (N/m) | Cornering stiffness N/° |
|---|---|---|---|
| Reference tire | 1.9E+06 | 1.6E+06 | 2E+04 |
| Tire of the invention | 2.3E+06 | 1.2E+06 | 2E+04 |

A 20% increase in radial stiffness may be seen for the tire of the invention, confirming its ability to carry 15% more load.

The 25% drop in indentation stiffness confirms the improved ability of the tire of the invention to run over indenting features.

The cornering stiffnesses remain the same between the control and the tire of the invention. The ability of the tire of the invention to guide the vehicle is not impaired.

The results confirm that the compromise sought by the inventors, to improve the load-bearing capability of the tire without impairing its ability to run over obstacles, has been achieved.

The invention claimed is:

1. A tire for a heavy-duty vehicle of construction plant type, comprising:

radially from the outside to the inside, a tread, a crown reinforcement and a carcass reinforcement, said crown reinforcement comprising at least one crown layer formed of elastic metal reinforcers coated in an elastomer compound and making, with a circumferential direction (XX'), an angle A;

said carcass reinforcement being made up of at least two carcass layers comprising metal reinforcers coated in an elastomer compound, said carcass layers having stiffnesses per unit width R1, R2, for first and second layers, respectively, measured in the equatorial plane (XY), wherein the metal reinforcers of the first carcass layer form, with the circumferential direction (XX'), an angle A1, and the metal reinforcers of the second carcass layer form, with the circumferential direction (XX'), an angle A2, such that the angles A1 and A2, and the stiffnesses R1 and R2, measured in the equatorial plane (XZ), simultaneously satisfy the following three relationships:

$$R1*\sin^2(2*A1)+R2*\sin^2(2*A2)\geq(R1+R2)*\sin^2(30°), \quad \text{a}$$

$$||A1|-|A2||<10°, \quad \text{b}$$

$$0.7\leq R1/R2\leq 1.3, \quad \text{c}$$

and wherein the metal reinforcers of each carcass layer have a critical compression buckling deformation DF at least equal to 2.5% and a compression elastic modulus MC at least equal to 10 GPa, wherein the metal reinforcers of each carcass layer are multistrand rope cords of structure 1×N comprising a single layer of N strands wound in a helix, each strand comprising an internal layer of M internal threads wound in a helix and an external layer of P external threads wound in a helix around the internal layer.

2. The tire for a heavy-duty vehicle of construction plant type according to claim 1, wherein the angles A1 and A2 have opposite orientations, with respect to the circumferential direction (XX').

3. The tire for a heavy-duty vehicle of construction plant type according to claim 1, wherein the angles A1 and A2 are angles, in terms of absolute value, with respect to the circumferential direction (XX'), which are comprised in the range of 15°-75°.

4. The tire for a heavy-duty vehicle of construction plant type according to claim 1, wherein the stiffnesses per unit width of layer R1, R2, for the first carcass layer and second carcass layer, respectively, are identical.

5. The tire for a heavy-duty vehicle of construction plant type according to claim 1, wherein N=3 or N=4.

6. The tire for a heavy-duty vehicle of construction plant type according to claim 1, wherein M=1, 3, or 4.

7. The tire for a heavy-duty vehicle of construction plant type according to claim 1, wherein P=5, 6, 8 or 9.

8. The tire for a heavy-duty vehicle of construction plant type according to claim 1, wherein the first carcass layer is an interior first carcass layer comprising a main part wrapped, within each bead, from the inside towards the outside of the tire, around a bead wire nucleus to form a turn-up, and the second carcass layer is an exterior second carcass layer comprising a main part wrapped, at least partially within each bead, from the outside towards the inside of the tire, around the bead wire nucleus.

9. The tire for a heavy-duty vehicle of construction plant type according to claim 1, wherein each carcass layer comprises a main part wrapped, within each bead, from the inside towards the outside of the tire, around a bead wire nucleus to form a turn-up.

10. The tire according to claim 1, wherein the angle A of the crown reinforcement elastic metal reinforcers is at most equal to 2.5° in terms of absolute value.

* * * * *